(12) United States Patent
Tomita (10) Patent No.: US 7,313,069 B2
(45) Date of Patent: Dec. 25, 2007

(54) OPTICAL RECORDING MEDIUM AND RECORDING APPARATUS, THE MEDIUM INCLUDING A LINKING REGION BETWEEN UNIT BLOCK REGIONS

(75) Inventor: Yoshimi Tomita, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 561 days.

(21) Appl. No.: 10/636,709

(22) Filed: Aug. 8, 2003

(65) Prior Publication Data
US 2004/0027957 A1 Feb. 12, 2004

(30) Foreign Application Priority Data
Aug. 12, 2002 (JP) ............................. 2002-234476
Jan. 28, 2003 (JP) ............................. 2003-019159

(51) Int. Cl.
*G11B 7/00* (2006.01)
(52) U.S. Cl. ............................. 369/53.35; 369/59.21; 369/59.25
(58) Field of Classification Search ..................... None
See application file for complete search history.

(56) References Cited

U.S. PATENT DOCUMENTS

| | | | |
|---|---|---|---|
| 5,528,569 A | 6/1996 | Fujiie et al. ................... 369/48 |
| 5,850,382 A * | 12/1998 | Koishi et al. ............. 369/275.3 |
| 5,949,750 A | 9/1999 | Matsui |
| 6,067,281 A * | 5/2000 | Kobayashi et al. ....... 369/275.3 |
| 6,115,340 A * | 9/2000 | Van Den Enden et al. ............. 369/275.3 |
| 6,191,903 B1* | 2/2001 | Fujimoto et al. ........ 369/59.26 |
| 6,282,162 B1* | 8/2001 | Tobita et al. ............. 369/59.23 |
| 2001/0006497 A1 | 7/2001 | Shin |
| 2002/0054681 A1* | 5/2002 | Kuribayashi et al. ....... 380/210 |
| 2002/0064277 A1 | 5/2002 | Kuribayashi et al. |
| 2002/0172123 A1* | 11/2002 | Ohmi ...................... 369/59.25 |
| 2003/0161239 A1* | 8/2003 | Yamawaki ............... 369/59.25 |
| 2004/0030983 A1* | 2/2004 | Tomita ....................... 714/776 |
| 2004/0165504 A1* | 8/2004 | Kobayashi ............... 369/59.25 |
| 2004/0184393 A1* | 9/2004 | Kim et al. ............... 369/275.3 |
| 2005/0088944 A1 | 4/2005 | Shoji et al. |

FOREIGN PATENT DOCUMENTS

| | | |
|---|---|---|
| CN | 1219726 A | 6/1999 |
| JP | 61-220134 | 3/1986 |
| JP | 04-301264 | 10/1992 |
| JP | 5-89602 | 4/1993 |
| JP | 08-55343 | 2/1996 |
| JP | 10-049997 | 2/1998 |
| JP | 10-501916 | 2/1998 |
| JP | 11-96602 | 4/1999 |
| JP | 11-232797 | 8/1999 |
| JP | 2002-50136 | 2/2002 |
| JP | 2002-133780 | 5/2002 |
| JP | 2002-150698 | 5/2002 |
| KR | 10-0254508 | 5/2000 |
| WO | WO98/18121 | 4/1998 |
| WO | WO 02/052558 | 7/2002 |

* cited by examiner

*Primary Examiner*—Thang V. Tran
*Assistant Examiner*—Nathan Danielsen
(74) *Attorney, Agent, or Firm*—Drinker Biddle & Reath LLP (57) ABSTRACT

An optical recording medium having a track on which data has been previously recorded, comprising on the track a plurality of data block regions each of which includes main data of a block which is divided into a predetermined number of main data pieces, each of which has data for identifying the main data, and linking regions each of which has pseudo data and is inserted between the data block regions. When the linking regions on said track are adjacent, recording patterns of the pseudo data of the adjacent linking regions are different from each other. Further provided is a recording apparatus forming the data block regions and linking regions on a recording medium.

18 Claims, 10 Drawing Sheets

OPTICAL RECORDING MEDIUM AND RECORDING APPARATUS, THE MEDIUM INCLUDING A LINKING REGION BETWEEN UNIT BLOCK REGIONS

BACKGROUND OF THE INVENTION

1. Field of the Invention

The present invention relates to an optical recording medium and to a recording apparatus for forming the recording medium.

2. Description of the Related Art

On a recordable optical recording medium such as DVD-R and DVD-RW, when new information data is written behind a location that has already been written, a linking region is formed at that junction portion. Synchronization data for reading the information data written into a data region, which follows the linking region, is written into the linking region.

However, the fact that linking regions are formed on such a recordable recording medium leads to a problem that there is a possibility of incompatibility in the recording format with read-only recording media such as DVD-ROMs that are not recordable.

SUMMARY OF THE INVENTION

It is an object of the present invention to provide a read-only optical recording medium that is compatible with recordable optical recording media in the recording format and, apparatus and method for forming the read-only optical recording medium.

An optical recording medium having recorded data on a track thereof, according to the present invention, comprises on the track: a plurality of data block regions each of which includes main data of a block which serves as an error correction unit for the main data and which is divided into a predetermined number of main data pieces, each of which has data for identifying the main data; and linking regions each of which has pseudo data and is inserted between the plurality of data block regions; wherein when the linking regions on the track are adjacent, recording patterns of the pseudo data of the adjacent linking regions are different from each other.

A recording apparatus for recording data onto a track of an optical recording medium, according to the present invention, comprises: a main data recording device which forms on the track a plurality of data block regions each of which includes main data of a block which serves as an error correction unit for the main data and which is divided into a predetermined number of main data pieces, each of which has data for identifying the main data; and a linking data recording device which inserts linking regions each of which has pseudo data between the plurality of data block regions onto the track; wherein the linking data recording means, when the linking regions on the track are adjacent, forms the pseudo data of the adjacent linking regions with recording patterns which are different from each other.

A recording method for recording data onto a track of an optical recording medium, according to the present invention, comprises the steps of: forming on the track a plurality of data block regions each of which includes main data of a block which serves as an error correction unit for the main data and which is divided into a predetermined number of main data pieces, each of which has data for identifying the main data; and inserting linking regions each of which has pseudo data between the plurality of data block regions onto the track; wherein when the linking regions on the track are adjacent, the pseudo data of the adjacent linking regions is formed with recording patterns which are different from each other.

DETAILED DESCRIPTION OF THE INVENTION

The present invention will be described below in more detail with reference to the accompanying drawings in accordance with the embodiments.

Figure 1:
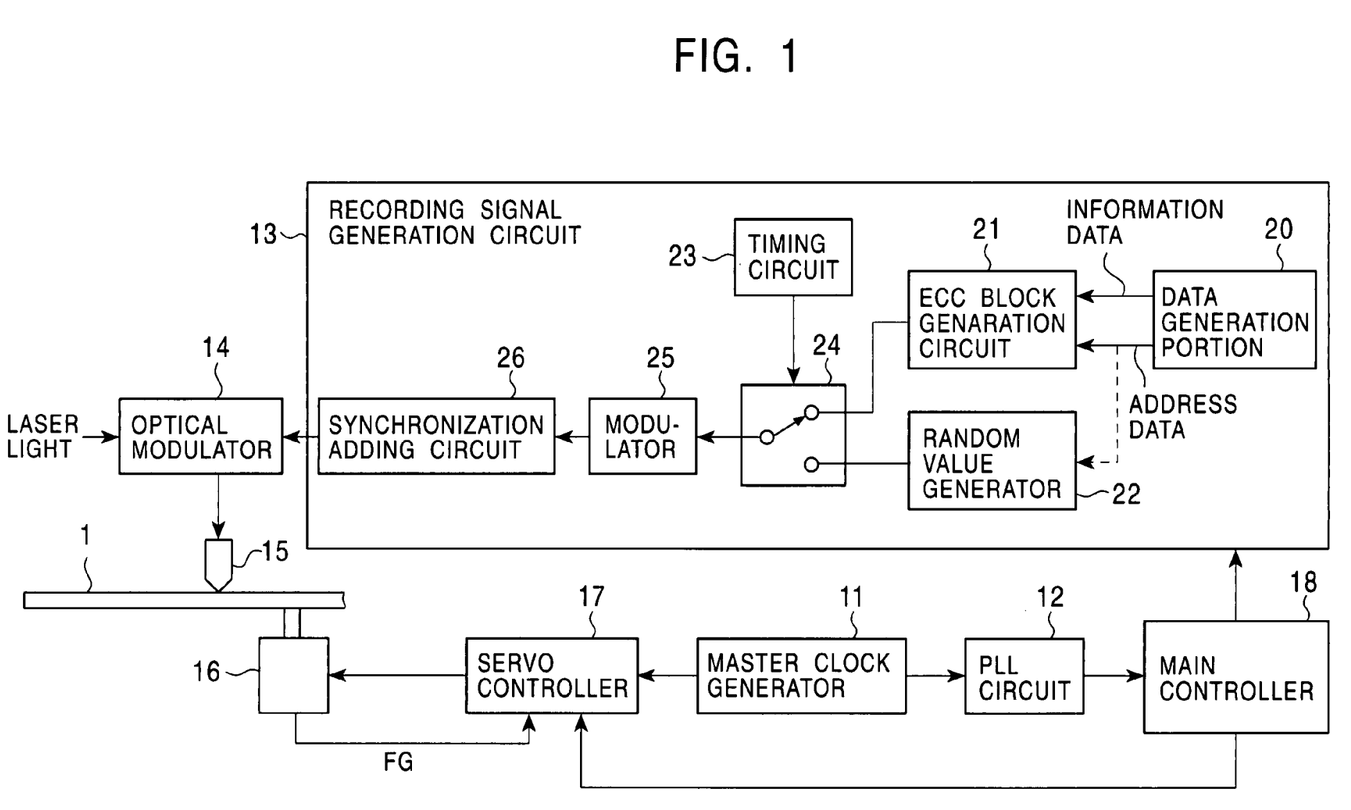
FIG. 1 is a block diagram showing the configuration of a recording apparatus according to the present invention.

FIG. 1 shows an original disk recording apparatus according to the present invention. The recording apparatus records information onto an original recording disk 1 for DVD-ROMs, and includes a master clock generator 11, a PLL circuit 12, a recording signal generation circuit 13, an optical modulator 14, a recording actuator 15, a spindle motor 16, a servo controller 17, and a main controller 18.

The master clock generator 11 generates a master clock signal, and supplies the master clock signal to the PLL circuit 12 and the servo controller 17. The servo controller 17 is supplied with the master clock signal, and with a frequency signal FG indicating a rotation frequency from the spindle motor 16. The servo controller 17 carries out rotation control for the spindle motor 16 such that the frequency signal FG is synchronized with the master clock signal, that is, it carries out spindle servo control.

The PLL circuit 12 generates a recording clock signal based on the master clock signal. The recording signal generation circuit 13 includes a data generation portion 20, an ECC block generation circuit 21, a random value generator 22, a timing circuit 23, a switching circuit 24, a modulator 25, and a synchronization adding circuit 26. The data generation portion 20 outputs information data (main data) to be recorded and address data corresponding to the information data. The ECC block generation circuit 21 outputs sector data adopted to ECC (error correction code) blocks based on the information data and the address data.

The random value generator 22 generates random data for linking regions. The timing circuit 23 generates a timing signal for each ECC block in response to the recording clock signal. The switching circuit 24 selectively outputs one of information data in the ECC block and the random data in accordance with the timing signal. The modulator 25 performs 8-16 modulation for data output from the switching circuit 24. The synchronization adding circuit 26 adds a synchronization code having a 14T synchronization pattern to the modulated data so as to output a recording signal. The main controller 18 controls the components 20 to 26 inside the recording signal generation circuit 13 in synchronization with the output clock of the PLL circuit 12.

The optical modulator 14 modulates laser light in accordance with the recording signal output from the recording signal generation circuit 13, and supplies the modulated laser light to a recording actuator 15. The recording actuator 15 irradiates the laser light onto the recording portion of the original recording disk 1 rotated by the spindle motor 16, thus carrying out exposure.

Figure 2:
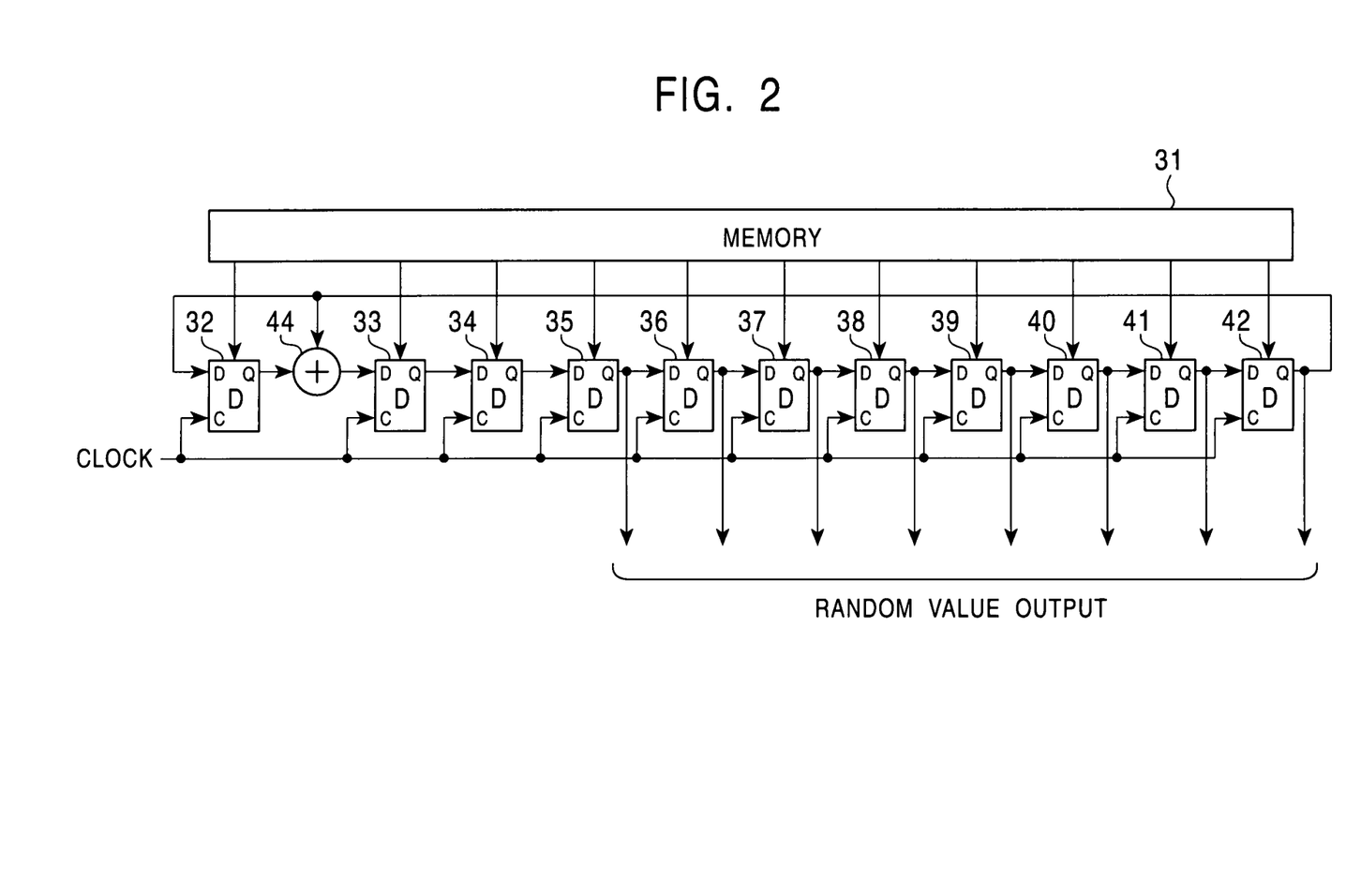
FIG. 2 is a block diagram illustrating the configuration of a random value generator in the apparatus in FIG. 1.

As shown in FIG. 2, the random value generator 22 includes a memory 31, eleven D flip-flop circuits 32 to 42, and one adder 44. An initial value of eleven bits is previously stored in the memory 31, and each one bit is supplied to the D flip-flops circuits 32 to 42 in response to a command from the main controller 18 at the beginning of recording of the original recording disk 1. Each of the D flip-flops circuits 32 to 42 has a preset input, and the bits corresponding to the initial value is respectively supplied to those preset inputs from the memory 31. In response to the clock, each of the D flip-flops circuits 32 to 42 outputs from the output Q one bit of data supplied to the input D. The D flip-flops circuits 32 to 42 are connected in the form of a ring via the adder 44. That is to say, the adder 44 is connected between the flip-flop circuits 32 and 33, and the output Q of the flip-flop circuit 42 is connected to the adder 44 and to the input D of the flip-flop circuit 32. The adder 44 adds data of the output Q of the flip-flop circuit 32 and data of the output Q of the flip-flop circuit 42, and supplies a result of the addition to the input D of the flip-flop circuit 33. Data having eight bits for the linking region is output from the outputs Q of the D flip-flop circuits 35 to 42. The linking region data is pseudo data of an information data piece.

The following is an explanation of the operation of the original disk recording apparatus according to the present invention.

Based on information data and address data to be recorded, the ECC block generation circuit 21 successively produces and outputs a data pieces of 91 bytes.

Figure 3:
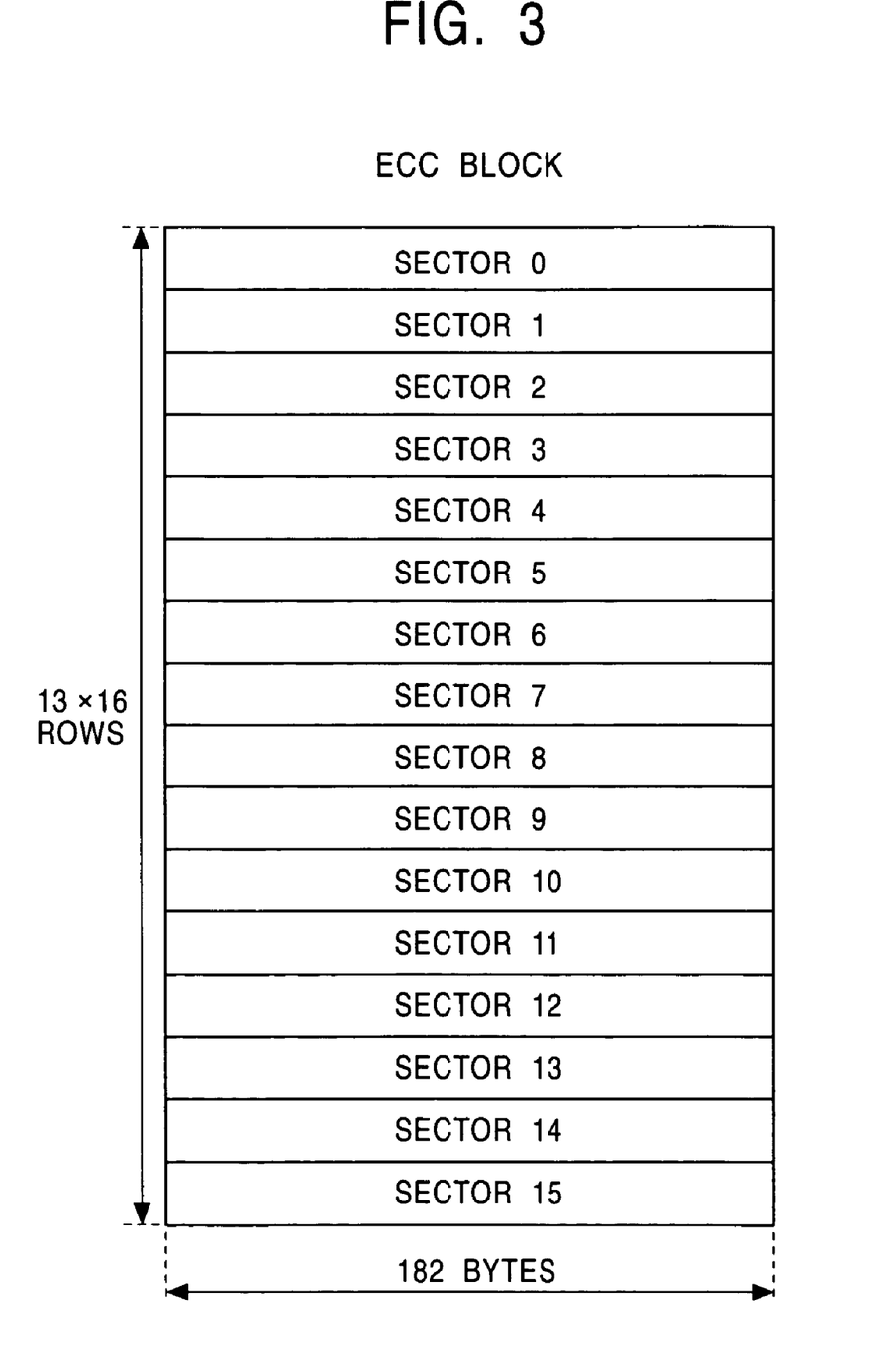
FIG. 3 is a diagram showing the data structure of one ECC block.

In the DVD format, one ECC block has sixteen sectors, as shown in FIG. 3. Each sector has a data structure of 13 rows×182 bytes. 91 bytes of each row constitute one data piece, so that each row has two data pieces (91 bytes×2).

The data pieces are supplied via the switching circuit 24 to the modulator 25. After having been subjected to 8-16 modulation, the data pieces are supplied to the synchronization adding circuit 26. The synchronization adding circuit 26 adds a synchronization code (32 bits) including a 14T synchronization pattern to the data pieces having 182 bytes (1456 bits) that have been modulated, to generate a recording signal. The synchronization code is one of eight codes SY0 to SY7, and serves as identification data for identifying data position in each sector.

Figure 4:
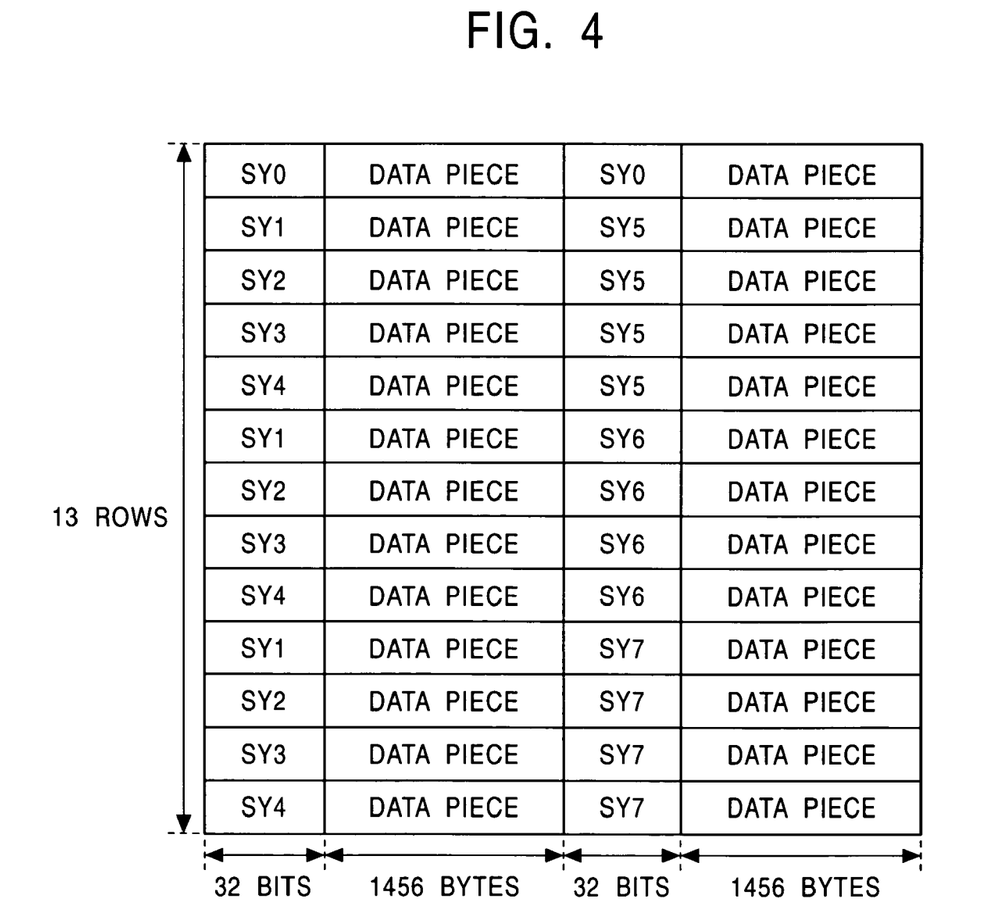
FIG. 4 is a diagram showing the data structure of the recording signal for one sector.

FIG. 4 illustrates the data structure of the recording signal for one sector. The synchronization code (SY0 to SY7) is located before the modulated data pieces, and two pairs of synchronization code and data piece are arranged in each row.

On the other hand, at the time of the beginning of the recording, the initial value is output from the memory 31 to the eleven D flip-flop circuits 32 to 42 in the random value generator 22. Each of the D flip-flop circuits 32 to 42 outputs a corresponding bit value of the initial value. The output values of the D flip-flop circuits 35 to 42 then serve as the linking region data. After that, whenever a clock signal is supplied, each of the D flip-flop circuits 32 to 42 read the output value of each of the D flip-flop circuits or the adder 44 connected to each input side, and the D flip-flop circuits 35 to 42 output as eight bits (one byte) of linking region data. As the clock is supplied to the clock terminals C of the D flip-flops 32 to 42 for every linking region, for example, the linking region data is renewed at each clock by an adding operation of the adder 44. The linking region data is pseudo data of the above-described data pieces, and consists of 91 bytes. For one linking region, linking region data of 91×2 bytes is generated.

The switching circuit 24 performs a switching operation in response to the timing signal after relaying the data pieces for one ECC block portion from the ECC block generation circuit 21. Thus, the switching circuit 24 becomes a state in which the output data from the random value generator 22 is relayed to the modulator 25. The linking region data is supplied from the random value generator 22 via the switching circuit 24 to the modulator 25. After being subjected to 8-16 modulation, the linking region data is supplied to the synchronization adding circuit 26. The synchronization adding circuit 26 adds a linking region synchronization code (32 bits) including a 14T synchronization pattern to the linking region data of 182 bytes (1456 bits) that have been modulated, to generate a recording signal. The first synchronization code of one row is SYX, and the second synchronization code is SYY. Each of the synchronization codes SYX and SYY has a pattern that is different from the synchronization codes SY0 to SY7, and represents a linking region.

Figure 5:
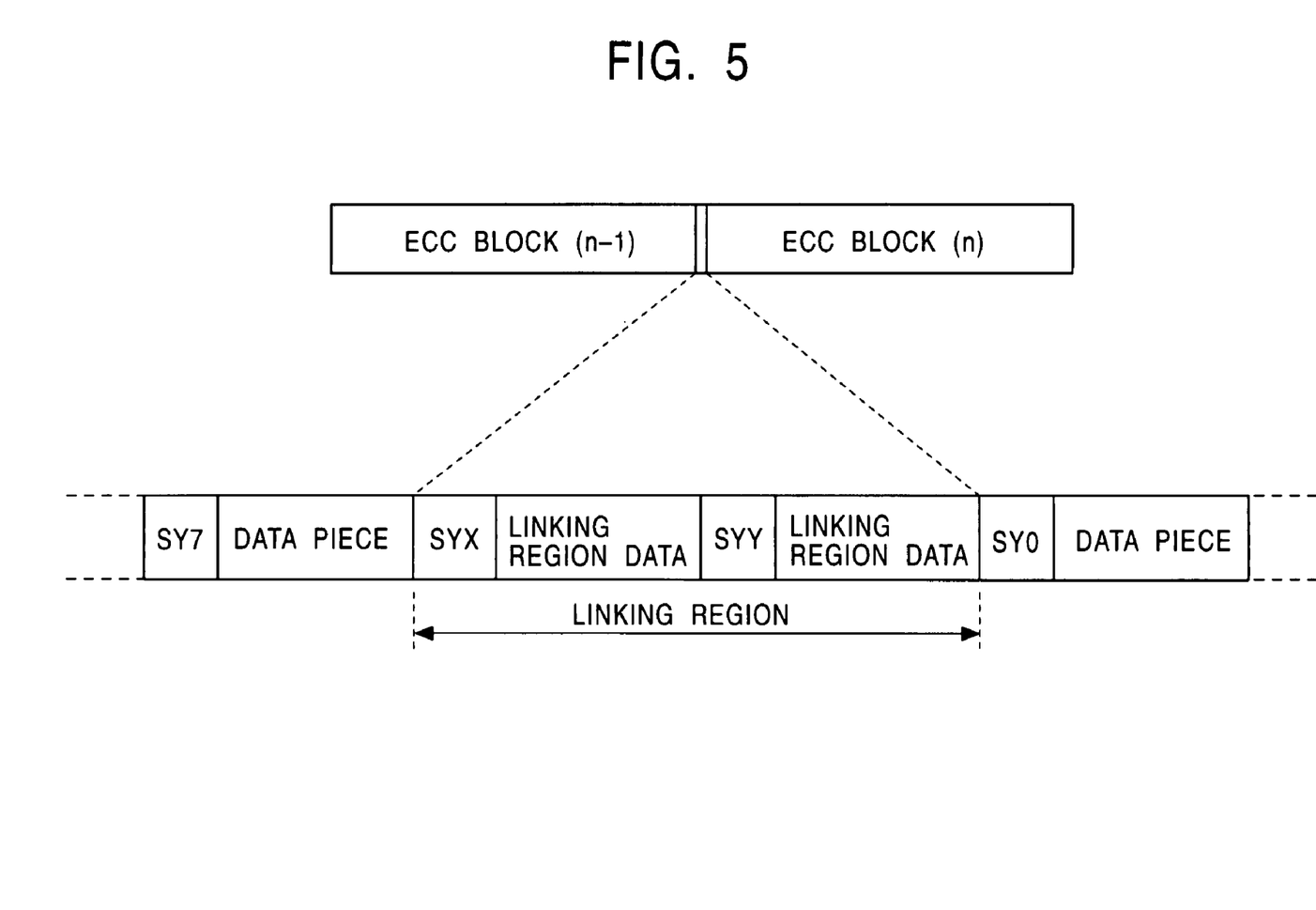
FIG. 5 is a diagram showing a linking region between ECC blocks.

The linking region is formed between ECC blocks (data block regions), and as shown in FIG. 5, includes two synchronization frames that are arranged between one ECC block (n−1) and the next ECC block (n).

The recording signal output from the recording signal generation circuit 13 modulates laser light in the optical modulator 14, and after the modulation, the laser light is supplied to the recording actuator 15. The recording actuator 15 irradiates the laser light onto the recording portion of the original recording disk 1, which is rotated by the spindle motor 16, and thus exposure is performed.

After producing a master disk from the original recording disk 1, optical disks are obtained by duplication with a stamper of the master disk.

Figure 6:
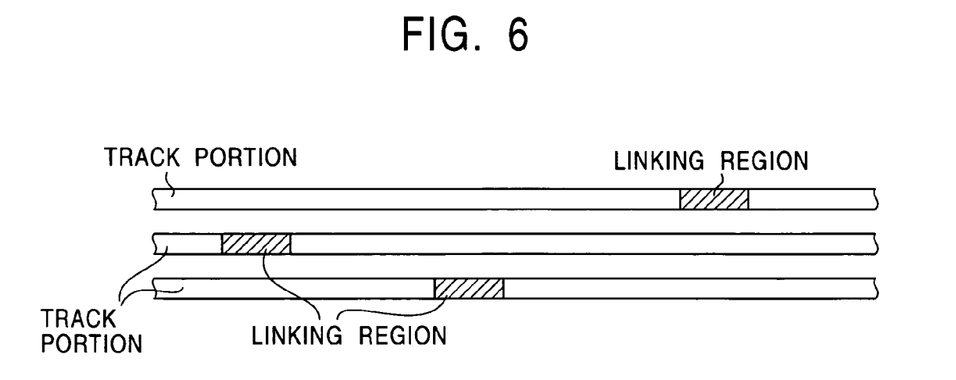
FIG. 6 is a diagram showing the position of each linking region on a track.
Figure 7:
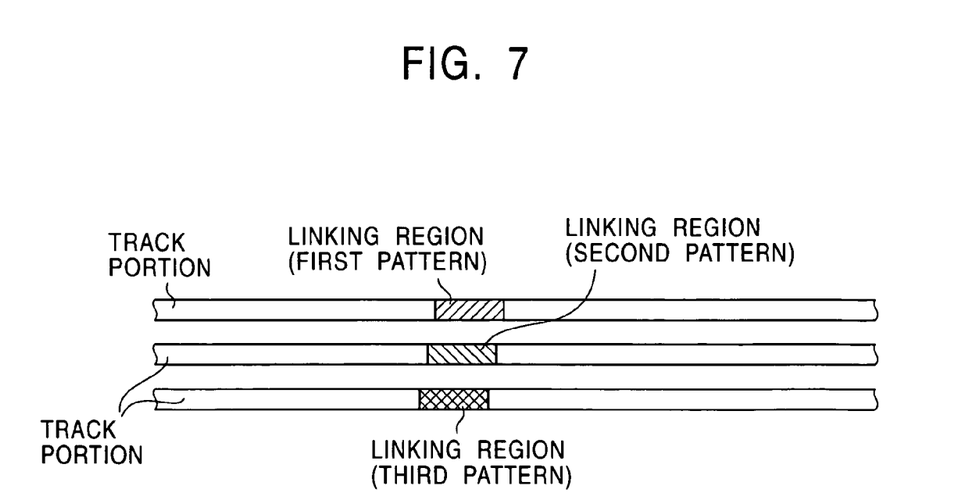
FIG. 7 is a diagram showing linking regions closely positioned between adjacent track portions.

Linking regions are formed on each track portion of the optical disk, as shown in FIG. 6 for example. Furthermore, between any adjacent track portions, the linking regions may be formed adjacently to one another, as shown in FIG. 7. However, since the random value generated from the random value generator 22 is used for the linking region data as described above, the data patterns of the linking region of the adjacent track portions are different from one another. For example, in the data patterns of adjacent linking regions shown in FIG. 7, the first pattern, the second pattern and the third pattern are mutually different.

In order to accurately read the information recorded on the optical disk, a tracking control for controlling a reading light beam on a recording track is performed. The phase-difference method can be used as the tracking control for high-density optical disks such as DVD-ROMs. In the phase-difference method, a tracking error signal is generated, which indicates the error between the irradiation position of the light beam and the recording track, in accordance with the difference between the sum signals of the light-receiving signals of opposite light-receiving portions in a photodetector partitioned into four partitions. In the case of the phase-difference method, when the correlation between adjacent track portions is strong, then the tracking error signal includes cross-talk components from the adjacent track portions, so that the tracking control becomes instable. If there are adjacent linking regions in adjacent track portions, the data pattern of those linking regions are different from one another, so that the correlation of the adjacent track portions can be reduced. Thus, it is possible to attain a stable tracking control even when using the phase-difference method for the tracking control.

It is possible that the random value generator 22 uses current address data (which indicates an address of the adjacent data region) as the initial value. That is to say, as indicated by a dashed line in FIG. 1, address data may be supplied to the random value generator 22, and the address data may be input from the preset input into the D flip-flop circuits 32 to 42 when the first linking region has been reached, to generate the linking region data. Furthermore, it is also possible to prepare a plurality of initial values in the memory 31, and to select one of the plurality of initial values in accordance with the address data.

Figure 8:
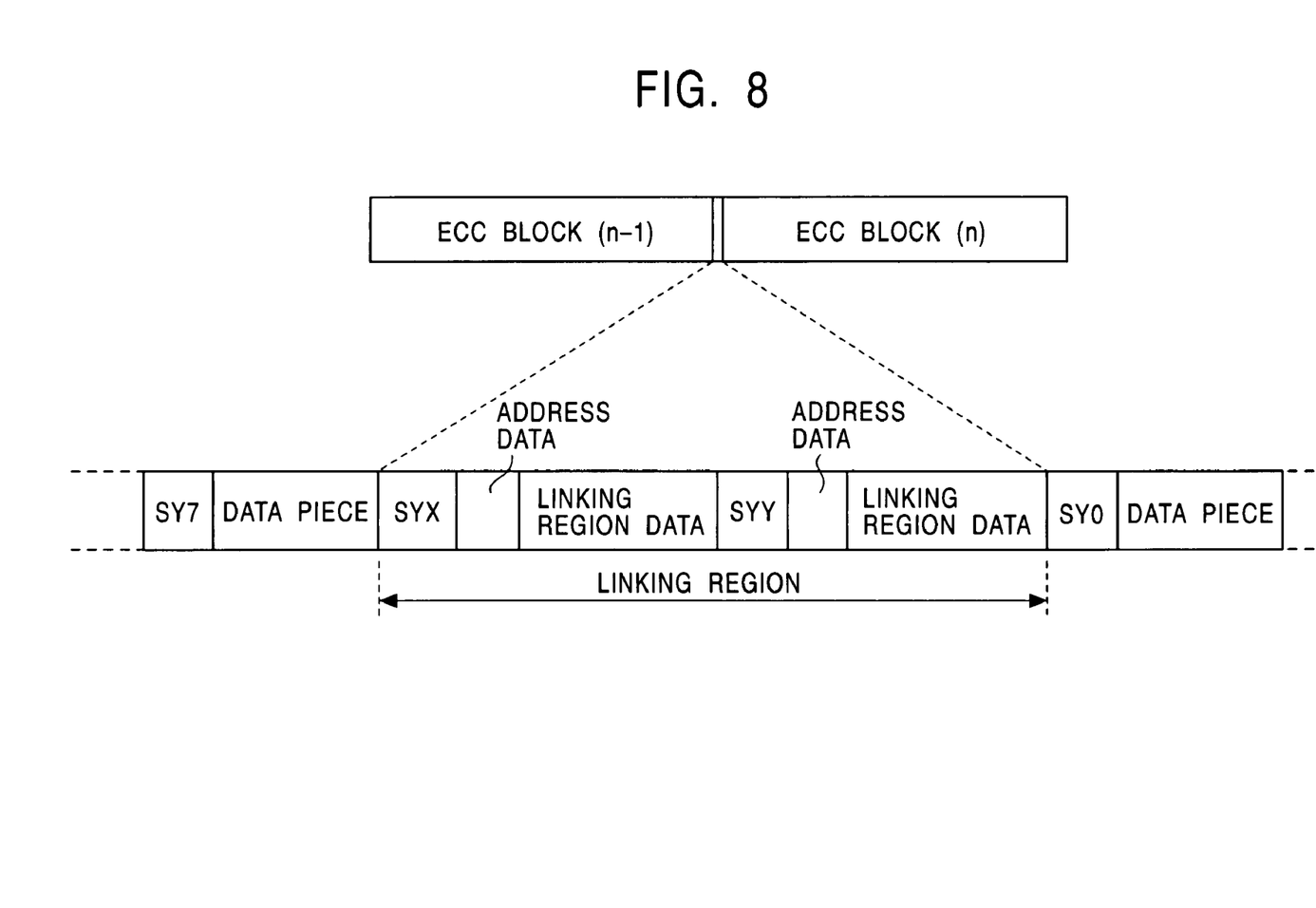
FIG. 8 is a diagram showing a linking region including address data that is arranged between ECC blocks.

If the address data is used as the initial value, then the address data may also be recorded together with the random linking region data in the random value generator 22. For example, as shown in FIG. 8, the synchronization codes SYX and SYY, the address data and the linking region data are arranged in that order in the two synchronization frames of the linking region. If the random value generation pattern of the random value generator 22 corresponding to the initial value is previously known, then it is possible to read out the address data and the linking region data, and to use the linking region data as useful data, based on the relation between the address data and the linking region data.

Figure 9:
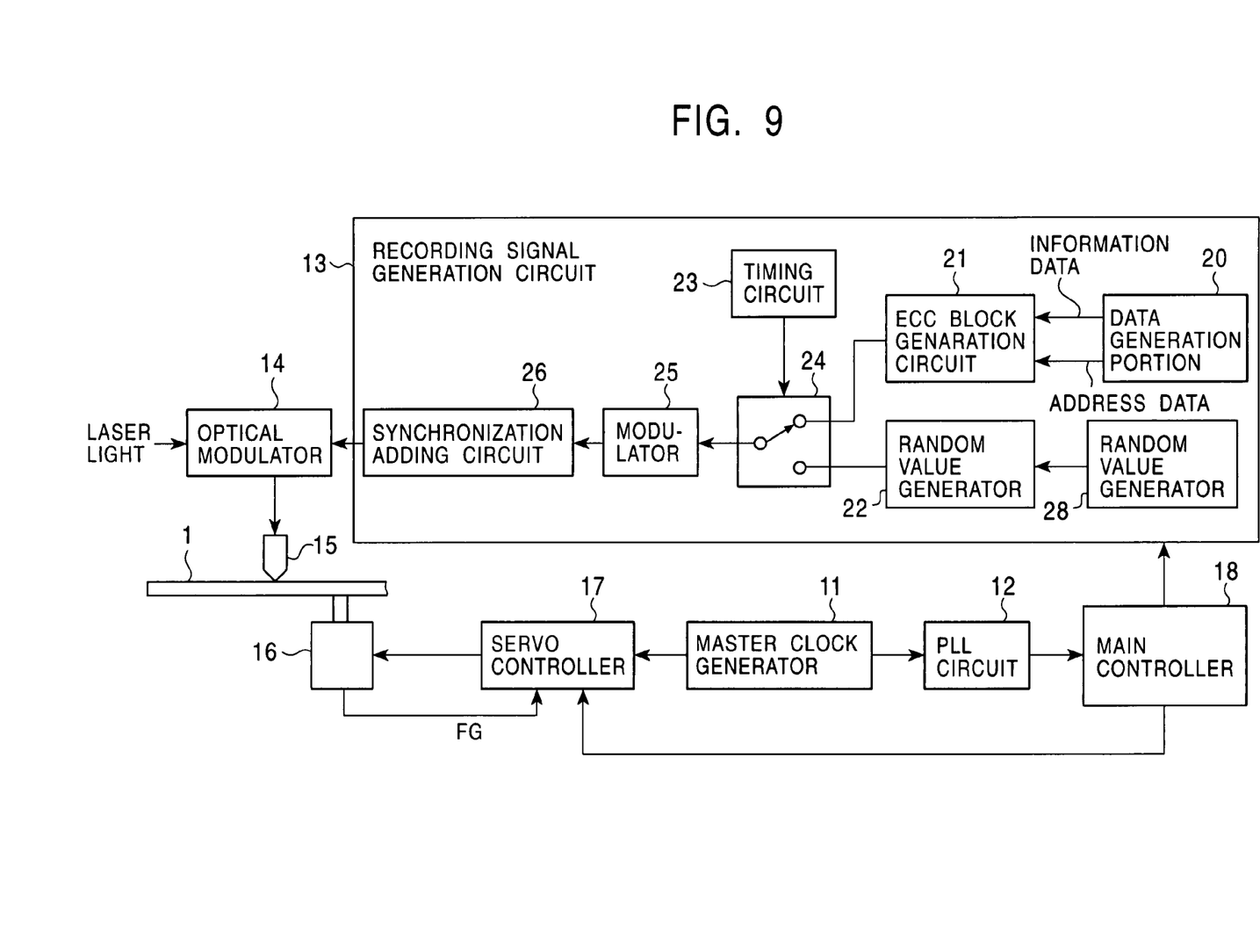
FIG. 9 is a block diagram of the configuration of a recording apparatus as another embodiment of the present invention.

Moreover, as shown in FIG. 9, it is also possible to connect the random value generator 22 in series with a random value generator 28 having the same configuration as the generator 22.

Figure 10:
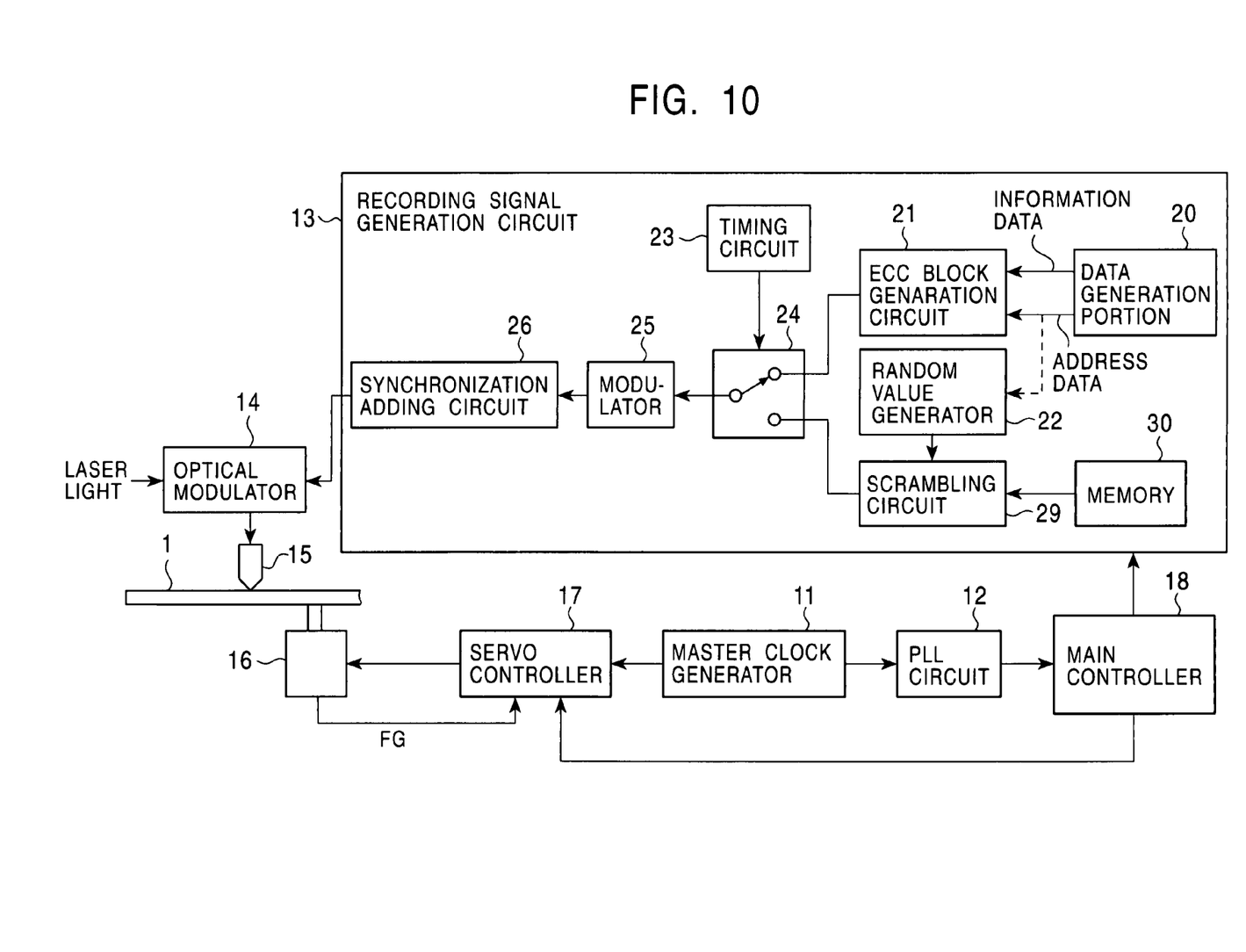
FIG. 10 is a block diagram of the configuration of a recording apparatus as another embodiment of the present invention.

Furthermore, as a configuration for generating linking region data, it is also possible to use a random value generator 22, a scrambling circuit 29 and a memory 30, as shown in FIG. 10. The scrambling circuit 29 consists of an EX-OR circuit. Scrambling data of eight bits is previously written into the memory 30. In the scrambling circuit 29, the EX-OR value of the scrambling data and the linking region data generated by the random value generator 22 for each linking region is obtained, and that value is used as the final linking region data.

FIG. 10 shows another configuration example of a recording signal generation circuit 13. In the linking region data generation portion in FIG. 10, it is possible to connect the random value generator 22 in series with a random value generator 28, as in the configuration shown in FIG. 9. Furthermore, it is also possible to supply the address data to the random value generator 22, as indicated by a dashed line in FIG. 10, and to use the address data at the time of the beginning of recording as the initial value.

Figure 11:
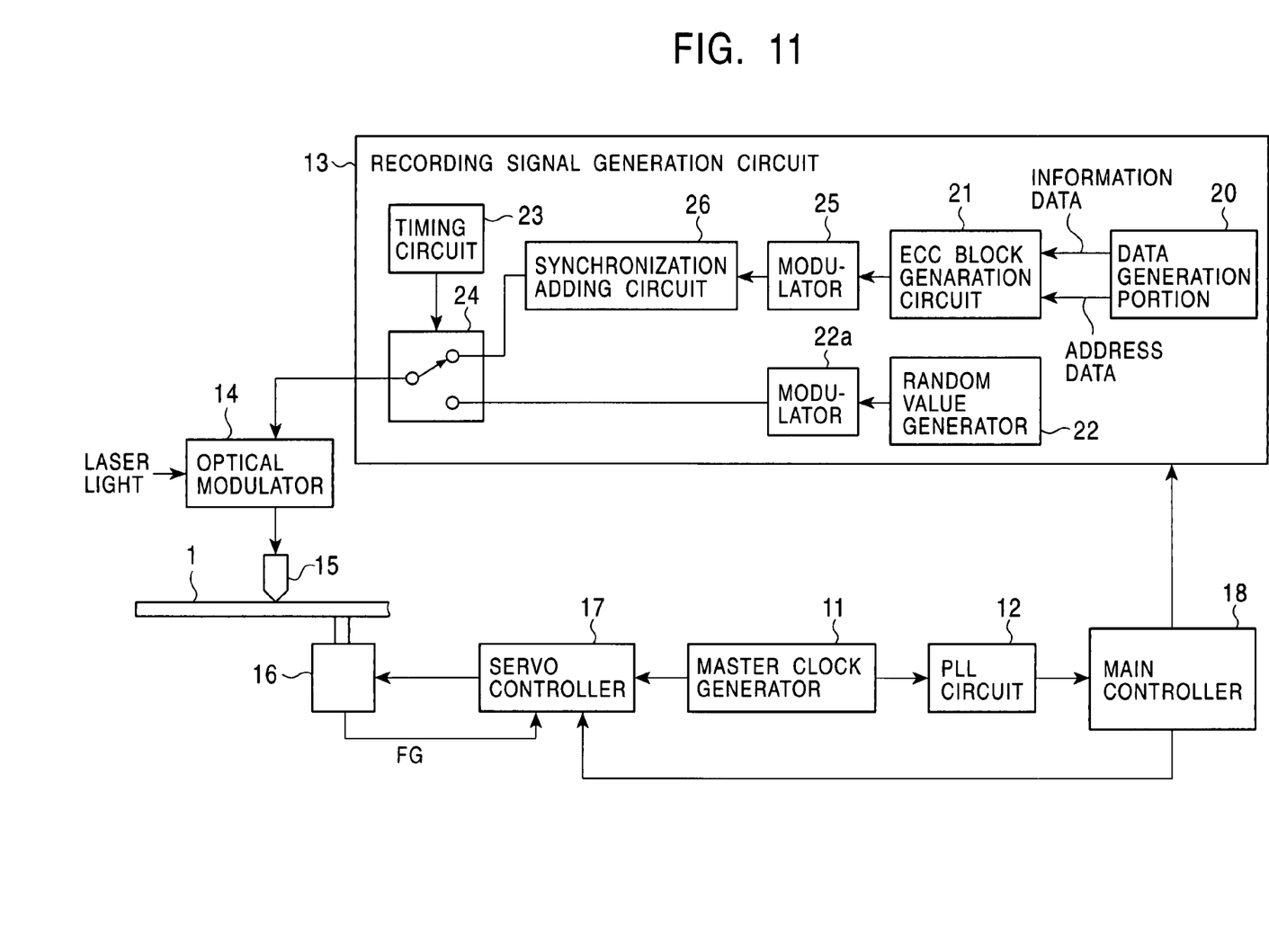
FIG. 11 is a block diagram of the configuration of a recording apparatus as another embodiment of the present invention.

FIG. 11 shows another configuration example of a recording signal generation circuit 13. In the recording signal generation circuit 13 in FIG. 11, the ECC block generation circuit 21, the modulator 25, the synchronization adding circuit 26 and the switching circuit 24 are connected in that order, and the switching circuit 24 is provided in the stage following the synchronization adding circuit 26. The random value generator 22 and a modulator 22a are provided as a configuration for generating linking region data. After the linking region data output from the random value generator 22 have been subjected to 8-16 modulation by the modulator 22a, the data is supplied to the switching circuit 24. In accordance with the timing signal output from the timing circuit 23, the switching circuit 24 selectively supplies either the output data of the synchronization adding circuit 26 or the output data of the modulator 22a to the optical modulator 14. Thus, no synchronization code is added to the linking region data, so that the linking region formed between the ECC blocks on the track of the disk 1 has only linking region data that is pseudo data not including the synchronization code.

In the recording apparatus as described above, linking data recording means forms the pseudo data of the adjacent linking regions with recording patterns which are different from each other. In the optical recording medium, the recording patterns of pseudo data of linking regions that are located on adjacent track portions of a track are different from one another. Thus, it is possible to provide read-only non-recordable optical recording media such as DVD-ROMs and recordable optical recording media such as DVD-RWs, with compatibility regarding the recording format. As a result, recording medium players can be designed with a simple configuration. This application is based on Japanese Patent Applications No. 2002-234476 and No. 2003-019159 which are hereby incorporated by reference.

What is claimed is:

1. An optical recording medium having recorded information data on a track thereof, comprising on said track:
    unit block regions in which unit blocks, each of which serves as an error correction unit for said information data, are recorded in a plurality of frames to which a sync code is added respectively; and
    a linking region inserted into a boundary portion between two of said unit block regions, in which a sync code having a pattern different from that of said sync code in said unit block regions and linking data are recorded;
    wherein linking data recorded in said linking region is scrambled, so that recording patterns of said linking data are different between adjacent tracks.

2. An optical recording medium according to claim 1, wherein said linking data is generated by scrambling a value obtained using address information.

3. An optical recording medium according to claim 2, wherein said address information is address information of a unit block region adjoining said linking region.

4. A recording apparatus for recording information data onto a track of an optical recording medium, comprising:
    a block recording device which forms, on the track, unit block regions in which unit blocks, each of which serves as an error correction unit for said information data, are recorded in a plurality of frames to which a sync code is added respectively; and
    a linking data recording device which inserts a linking region, in which a sync code having a pattern different from that of said sync code in said unit block regions and linking data are recorded, into a boundary portion between two of said unit block regions,
    wherein said linking data recording device records linking data generated by scrambling a predetermined data piece onto said linking region, so that recording patterns of said linking data are different between adjacent tracks.

5. A recording method for recording information data onto a track of an optical recording medium, comprising the steps of:
forming, on the track, unit block regions in which unit blocks, each of which serves as an error correction unit for the information data, are recorded in a plurality of frames to which a sync code is added respectively;
forming a linking region, in which a sync code having a pattern different from that of said sync code in said unit block regions and linking data are recorded, by insertion into a boundary portion between two of said unit block regions; and
recording, in said linking region, linking data generated by scrambling a predetermined data piece, so that recording patterns of said linking data are different between adjacent tracks.

6. An optical recording medium having recorded information data on a track thereof, comprising on said track:
unit block regions in which unit blocks, each of which serves as an error correction unit for said information data, are recorded in a plurality of frames to which a sync code is added respectively; and
a linking region inserted into a boundary portion between two of said unit block regions, in which a sync code having a pattern different from that of said sync code in said unit block regions and linking data are recorded;
wherein linking data recorded in said linking region is a random number generated using address information as an initial value, so that recording patterns of said linking data are different between adjacent tracks.

7. An optical recording medium according to claim 6, wherein linking data recorded in said linking region is an exclusive OR value of a data piece produced as a random number generated using address information as an initial value and a predetermined data piece.

8. An optical recording medium according to claim 6, wherein said address information is address information of a unit block region adjoining said linking region.

9. An optical recording medium having recorded information data on a track thereof, comprising on said track:
unit block regions in which unit blocks, each of which serves as an error correction unit for said information data, are recorded in a plurality of frames to which a sync code is added respectively; and
a linking region inserted between two of said unit block regions, in which a sync code having a pattern different from that of said sync code in said unit block regions and linking data are recorded;
wherein linking data recorded in said linking region is a data piece produced by bit-shifting using address information as an initial value, so that recording patterns of said linking data are different between adjacent tracks.

10. An optical recording medium according to claim 9, wherein linking data recorded in said linking region is an exclusive OR value of a data piece produced by bit-shifting using address information as an initial value and a predetermined data piece.

11. An optical recording medium according to claim 9, wherein said address information is address information of a unit block region adjoining said linking region.

12. A recording apparatus for recording information data onto a track of an optical recording medium, comprising:
a block recording device which forms, on the track, unit block regions in which unit blocks, each of which serves as an error correction unit for said information data, are recorded in a plurality of frames to which a sync code is added respectively; and
a linking data recording device which inserts a linking region, in which a sync code having a pattern different from that of said sync code in said unit block regions and linking data are recorded, into a boundary portion between two of said unit block regions,
wherein said linking data recording device records, onto said linking region, linking data which is a random number generated using address information as an initial value, so that recording patterns of said linking data are different between adjacent tracks.

13. A recording apparatus for recording information data onto a track of an optical recording medium, comprising:
a block recording device which forms, on the track, unit block regions in which unit blocks, each of which serves as an error correction unit for said information data, are recorded in a plurality of frames to which a sync code is added respectively; and
a linking data recording device which inserts a linking region, in which a sync code having a pattern different from that of said sync code in said unit block regions and linking data are recorded, into a boundary portion between two of said unit block regions,
wherein said linking data recording device records, onto said linking region, linking data which is a data piece produced by bit-shifting using address information as an initial value, so that recording patterns of said linking data are different between adjacent tracks.

14. A recording method for recording information data onto a track of an optical recording medium, comprising the steps of:
forming, on the track, unit block regions in which unit blocks, each of which serves as an error correction unit for the information data, are recorded in a plurality of frames to which a sync code is added respectively;
forming a linking region, in which a sync code having a pattern different from that of said sync code in said unit block regions and linking data are recorded, by insertion into a boundary portion between two of said unit block regions; and
recording, in said linking region, linking data which is a random number generated using address information as an initial value, so that recording patterns of said linking data are different between adjacent tracks.

15. A recording method for recording information data onto a track of an optical recording medium, comprising the steps of:
forming, on the track, unit block regions in which unit blocks, each of which serves as an error correction unit for the information data, are recorded in a plurality of frame to which a sync code is added respectively;
forming a linking region, in which a sync code having a pattern different from that of said sync code in said unit block regions and linking data are recorded, by insertion into a boundary portion between two of said unit block regions; and
recording, in said linking region, linking data which is a data piece produced by bit-shifting using address information as an initial value, so that recording patterns of said linking data are different between adjacent tracks.

16. A method for producing an optical recording medium having recorded information data on a track thereof, comprising the steps of:
forming, on the track, unit block regions in which unit blocks, each of which serves as an error correction unit for the information data, are recorded in a plurality of frames to which a sync code is added respectively;

forming a linking region, in which a sync code having a pattern different from that of said sync code in said unit block regions and linking data are recorded, by insertion into a boundary portion between two of said unit block regions; and recording, in said linking region, linking data generated by scrambling a predetermined data piece, so that recording patterns of said linking data are different between adjacent tracks.

17. A method for producing an optical recording medium having recorded information data on a track thereof, comprising the steps of:

forming, on the track, unit block regions in which unit blocks, each of which serves as an error correction unit for the information data, are recorded in a plurality of frames to which a sync code is added respectively;

forming a linking region, in which a sync code having a pattern different from that of said sync code in said unit block regions and linking data are recorded, by insertion into a boundary portion between two of said unit block regions; and recording, in said linking region, linking data which is a random number generated using address information as an initial value, so that recording patterns of said linking data are different between adjacent tracks.

18. A method for producing an optical recording medium having recorded information data on a track thereof, comprising the steps of:

forming, on the track, unit block regions in which unit blocks, each of which serves as an error correction unit for the information data, are recorded in a plurality of frames to which a sync code is added respectively;

forming a linking region, in which a sync code having a pattern different from that of said sync code in said unit block regions and linking data are recorded, by insertion into a boundary portion between two of said unit block regions; and recording, in said linking region, linking data which is a data piece produced by bit-shifting using address information as an initial value, so that recording patterns of said linking data are different between adjacent tracks.

* * * * *